United States Patent
Jeong et al.

(10) Patent No.: US 9,973,041 B2
(45) Date of Patent: May 15, 2018

(54) ELECTRONIC COMPONENT THAT OPERATES STABLY OVER A RANGE OF TEMPERATURES AND APPARATUS INCLUDING THE SAME

(71) Applicant: Samsung Electro-Mechanics Co., Ltd., Suwon-si (KR)

(72) Inventors: In Wha Jeong, Suwon-Si (KR); Jong Heum Park, Suwon-Si (KR); Hugh Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 271 days.

(21) Appl. No.: 14/821,007

(22) Filed: Aug. 7, 2015

(65) Prior Publication Data

US 2016/0043570 A1    Feb. 11, 2016

(30) Foreign Application Priority Data

Aug. 8, 2014   (KR) .................. 10-2014-0102411
Jan. 21, 2015  (KR) .................. 10-2015-0009848

(51) Int. Cl.

| | |
|---|---|
| *H02J 50/12* | (2016.01) |
| *H02J 5/00* | (2016.01) |
| *H01G 7/04* | (2006.01) |
| *H02J 7/02* | (2016.01) |
| *H02J 50/80* | (2016.01) |
| *H01G 4/258* | (2006.01) |
| *H01G 4/40* | (2006.01) |

(52) U.S. Cl.
CPC ............ *H02J 50/12* (2016.02); *H01G 4/258* (2013.01); *H01G 7/04* (2013.01); *H02J 5/005* (2013.01); *H02J 7/025* (2013.01); *H02J 50/80* (2016.02); *H01G 4/40* (2013.01)

(58) Field of Classification Search
CPC ....................................................... H05J 5/005
See application file for complete search history.

(56) References Cited

U.S. PATENT DOCUMENTS

| | | | |
|---|---|---|---|
| 7,167,058 B2 | 1/2007 | Meltzer | |
| 9,106,203 B2 * | 8/2015 | Kesler ...................... | H03H 7/40 |

FOREIGN PATENT DOCUMENTS

| | | |
|---|---|---|
| JP | 9-186513 A | 7/1997 |
| JP | 2000-252154 A | 9/2000 |
| JP | 2005-176357 A | 6/2005 |
| JP | 2008-85081 A | 4/2008 |
| JP | 2012-169589 A | 9/2012 |

OTHER PUBLICATIONS

Korean Office Action dated Nov. 11, 2015, in counterpart Korean Application No. 10-2015-0009848 (8 pages with English translation).

* cited by examiner

*Primary Examiner* — Hai L Nguyen
(74) *Attorney, Agent, or Firm* — NSIP Law

(57) ABSTRACT

An electronic component includes a first capacitor including a first dielectric material having a permittivity that is inversely proportional to temperature; and a second capacitor connected in parallel with the first capacitor and including a second dielectric material having a permittivity that is directly proportional to temperature.

14 Claims, 10 Drawing Sheets

ELECTRONIC COMPONENT THAT OPERATES STABLY OVER A RANGE OF TEMPERATURES AND APPARATUS INCLUDING THE SAME

CROSS-REFERENCE TO RELATED APPLICATION(S)

This application claims the benefit under 35 USC 119(a) of Korean Patent Application Nos. 10-2014-0102411 filed on Aug. 8, 2014, and 10-2015-0009848 filed on Jan. 21, 2015, in the Korean Intellectual Property Office, the entire disclosures of which are incorporated herein by reference for all purposes.

BACKGROUND

1. Field

This application relates to an electronic component in which fluctuations in capacitance due to changes in temperature are prevented, and an apparatus including the electronic component.

2. Description of Related Art

LC circuits are extensively used in various electronic devices. LC circuits generally include an inductor (L) and a capacitor (C), and the capacitor includes electrodes and a dielectric material disposed between the electrodes. A permittivity of the dielectric material changes according to temperature. Thus, when changes in temperature occur, changes in the capacitance of the capacitor also occur, and as a result, a resonant frequency of the LC circuit also changes.

Wireless power transfer techniques are currently being used to charge various communications devices, including smartphones, and home appliances, and are expected to be applied to electric vehicles in the future, and as such, wireless power transfer techniques have a very wide range of potential applications. Also, when power is transmitted wirelessly, a power transmission distance and a wireless power transmission efficiency may be increased by a magnetic resonance operation. Thus, wireless power transmitters and wireless power receivers include respective LC circuits to perform magnetic resonance operations in transmitting and receiving power wirelessly.

However, as the capacity of wireless power transmitters and wireless power receivers has increased, heat is generated in wireless power transmitters and wireless power receivers due to various types of power loss, and this heat changes the permittivity of a dielectric material of a resonant capacitor, resulting in a change in a resonant frequency of an LC circuit. In particular, as a resonant frequency (for example, 6.78 MHz in the Alliance for Wireless Power (A4WP) Rezence standard) increases, variations in the resonant frequency may also increase. Such variations in the resonant frequency reduce the efficiency of wireless charging, increase losses in an LC circuit, and cause heating.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic component include a first capacitor including a first dielectric material having a permittivity that is inversely proportional to temperature; and a second capacitor connected in series with the first capacitor and including a second dielectric material having a permittivity that is directly proportional to temperature.

A variation in a capacitance of the first capacitor according to a unit change in temperature and a variation in a capacitance of the second capacitor according to a unit change in temperature may be substantially equal in magnitude but opposite in sign at a same temperature.

The first capacitor and the second capacitor may include a ceramic body; a first external electrode and a second external electrode respectively disposed on opposing end portions of the ceramic body in a first direction; and first, second, third and fourth internal electrodes disposed in the ceramic body and extending in the first direction and stacked in a second direction intersecting the first direction; and the first and third internal electrodes may be connected to the first external electrode; the second and fourth internal electrodes may be connected to the second external electrode; the first dielectric material may be disposed in the ceramic body between the first and second internal electrodes; the second dielectric material may be disposed in the ceramic body between the third and fourth internal electrodes; the first and second internal electrodes and the first dielectric material may constitute the first capacitor; and the third and fourth internal electrodes and the second dielectric material may constitute the second capacitor.

The first and second internal electrodes may be disposed in one portion of the ceramic body in the second direction; and the third and fourth internal electrodes may be disposed in another portion of the ceramic body in the second direction.

Each of the first, second, third, and fourth internal electrodes may be provided in plural.

In another general aspect, an apparatus includes an electronic component including a first capacitor including a first dielectric material having a permittivity that is inversely proportional to temperature, and a second capacitor connected in parallel with the first capacitor and including a second dielectric material having a permittivity that is directly proportional to temperature; and a coil connected to the electronic component.

The apparatus may further include a power supply configured to supply alternating current (AC) power to the electronic component and the coil to cause the coil to transmit the supplied AC power wirelessly.

The power supply may include a controller configured to output a control signal; a power source configured to convert input power into supply power and output the supply power; and a switching circuit configured to convert the supply power into the AC power in response to the control signal and output the AC power to the electronic component and the coil.

The switching circuit may include a switch configured to be turned on and off by the control signal at a switching frequency equal or substantially equal to a resonant frequency determined by the electronic component and the coil.

A variation in a capacitance of the first capacitor according to a unit change in temperature and a variation in a capacitance of the second capacitor according to a unit change in temperature may be substantially equal in magnitude but opposite in sign at a same temperature.

The first capacitor and the second capacitor may include a ceramic body; a first external electrode and a second external electrode respectively disposed on opposing end portions of the ceramic body in a first direction; and first, second, third and fourth internal electrodes disposed in the ceramic body and extending in the first direction and stacked in a second direction intersecting the first direction; and the first and third internal electrodes may be connected to the first external electrode; the second and fourth internal electrodes may be connected to the second external electrode; the first dielectric material may be disposed in the ceramic body between the first and second internal electrodes; the second dielectric material may be disposed in the ceramic body between the third and fourth internal electrodes; the first and second internal electrodes and the first dielectric material may constitute the first capacitor; and the third and fourth internal electrodes and the second dielectric material may constitute the second capacitor.

The coil may be configured to receive power wirelessly; the apparatus may further include a rectifier configured to rectify the power received by the coil to output an output voltage; and the electronic component may include a first capacitor including a first dielectric material having a permittivity that is inversely proportional to temperature; and a second capacitor connected in parallel with the first capacitor and including a second dielectric material having a permittivity that is directly proportional to temperature.

The apparatus may further include a printed circuit board (PCB) including a first area in which the coil is disposed, and a second area in which the rectifier and the electronic component are disposed.

The apparatus may further include a printed circuit board (PCB) including a first area in which the coil is disposed, and a second area in which the rectifier is disposed; and the first capacitor and the second capacitor may be embedded within the PCB.

A variation in a capacitance of the first capacitor according to a unit change in temperature and a variation in a capacitance of the second capacitor according to a unit change in temperature may be substantially equal in magnitude but opposite in sign at a same temperature.

The first capacitor and the second capacitor may include a ceramic body; a first external electrode and a second external electrode respectively disposed on opposing end portions of the ceramic body in a first direction; and first, second, third and fourth internal electrodes disposed in the ceramic body and extending in the first direction and stacked in a second direction intersecting the first direction; and the first and third internal electrodes may be connected to the first external electrode; the second and fourth internal electrodes may be connected to the second external electrode; the first dielectric material may be disposed in the ceramic body between the first and second internal electrodes; the second dielectric material may be disposed in the ceramic body between the third and fourth internal electrodes; the first and second internal electrodes and the first dielectric material may constitute the first capacitor; and the third and fourth internal electrodes and the second dielectric material may constitute the second capacitor.

In another general aspect, an apparatus includes an electronic component including a first element having a characteristic that changes with temperature, and a second element connected to the first element and having a characteristic that changes with temperature in a direction that is opposite to a direction in which the characteristic of the first element changes with temperature; and a coil connected to the electronic component and forming a resonant circuit with the electronic component.

The first element may be a first capacitor having a permittivity that is inversely proportional to temperature; and the second element may be a second capacitor connected in parallel with the first capacitor and having a permittivity that is directly proportional to temperature.

The first element may be a capacitor having a permittivity that is inversely proportional to temperature, and the second element may be an inductor connected in series with the capacitor and having an inductance that is directly proportional to temperature; or the first element may be a capacitor having a permittivity that is directly proportional to temperature, and the second element may be an inductor connected in series with the capacitor and having an inductance that is inversely proportional to temperature.

The first element may be a capacitor having a permittivity that changes with temperature; the second element may be a variable inductor connected in series with the capacitor and having an inductance that changes in response to a control signal; and the apparatus may further include a controller configured to output a control signal to change the inductance of the variable inductor so that the inductance of the variable inductor changes with temperature in a direction that is opposite to a direction in which the permittivity of the capacitor changes with temperature.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
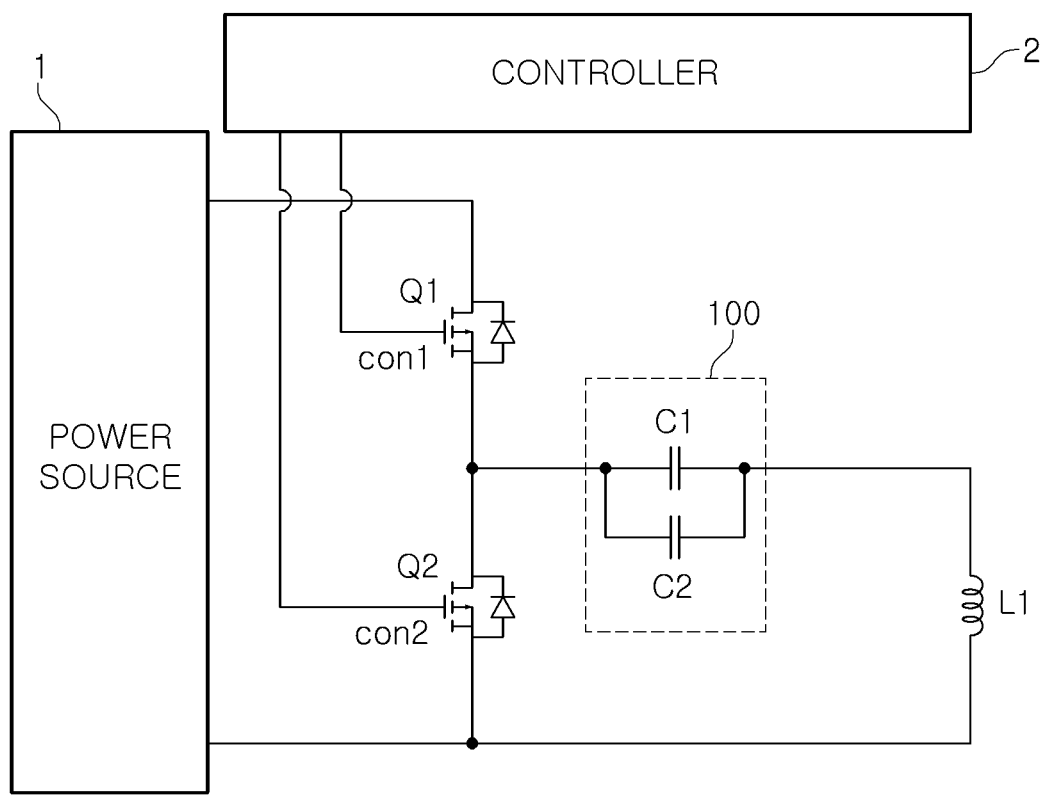
FIG. 1 is a view illustrating an example of a configuration of an apparatus including an electronic component.

FIG. 1 is a view illustrating an example of a configuration of an apparatus including an electronic component. As represented in FIG. 1, the apparatus is a wireless power transmitter. The wireless power transmitter includes a power source 2, two switching elements Q1 and Q2, an electronic component 100 including a first capacitor C1 and a second capacitor C2 connected in parallel with the first capacitor C1, a power transmission coil L1, and a controller 2. In the wireless power transmitter illustrated in FIG. 1, the electronic component 100 and the power transmission coil L1 form an LC circuit.

Functions of the blocks illustrated in FIG. 1 will now be described.

The power source 1 converts input power into supply power Vdc and outputs the converted power. The input power is alternating current (AC) power, and the supply power Vdc is direct current (DC) power. The power source 1 may have various forms.

The two switching elements Q1 and Q2 form a half-bridge switching circuit. That is, the two switching elements Q1 and Q2 complementarily perform ON/OFF switching operations in response to control signals con1 and con2 output from the controller 2 to convert the supply power Vdc into AC power and output the converted AC power. Although FIG. 1 shows that the wireless power transmitter includes the half-bridge switching circuit, this is merely an example, and the wireless power transmitter may include various other types of switching circuits instead of the half-bridge switching circuit, such as a full-bridge switching circuit.

The electronic component 100 includes the first capacitor C1 and the second capacitor C2 connected in parallel with each other. The first capacitor C1 includes a dielectric material having a permittivity that decreases as temperature increases, and the second capacitor C2 includes a dielectric material having a permittivity that increases as temperature increases. That is, the capacitance of the first capacitor C1 is inversely proportional to temperature, while the capacitance of the second capacitor C2 is directly proportional to temperature. The magnitude of the variation in the capacitance of the first capacitor C1 according to a unit change in temperature and the magnitude of the variation in the capacitance of the second capacitor C2 according to a unit change in temperature are substantially equal at the same temperature. Thus, even when changes in temperature occur, the capacitance of the electronic component 100 is maintained at a constant level.

That is, the capacitance of the electronic component 100 may be expressed as the sum of the capacitance of the first capacitor C1 and the capacitance of the second capacitor C2. Also, when the magnitude of the variation in the capacitance of the first capacitor C1 according to a unit change in temperature is $\Delta C$, the magnitude of the variation in the capacitance of the second capacitor C2 according to a unit change in temperature is $-\Delta C$. Thus, even though changes in temperature may occur, the capacitance of the electronic component 100 is maintained at a constant level.

The electronic component 100 may include two separate capacitors, and the two separate capacitors may constitute a single component, for example, a multilayer ceramic capacitor. Also, the first capacitor C1 and the second capacitor C2 each may be configured as a plurality of capacitors.

The controller 2 outputs the control signals con1 and con2. For example, the controller 2 outputs the control signals con1 and con2 to complimentarily turn the first switch Q1 and the second switch Q2 on and off at a switching frequency equal or substantially equal to a resonant frequency of power transmitted wirelessly by the wireless power transmitter.

The power transmission coil L1 transmits power wirelessly.

That is, a resonant frequency of the wireless power transmitter illustrated in FIG. 1 is determined by the product of the capacitance of the electronic component 100 and the inductance of the power transmission coil L1. As described above, since the capacitance of the electronic component 100 remains constant despite changes in temperature, a resonant frequency of the wireless power transmitter thus remains constant irrespective of temperature.

Figure 2:
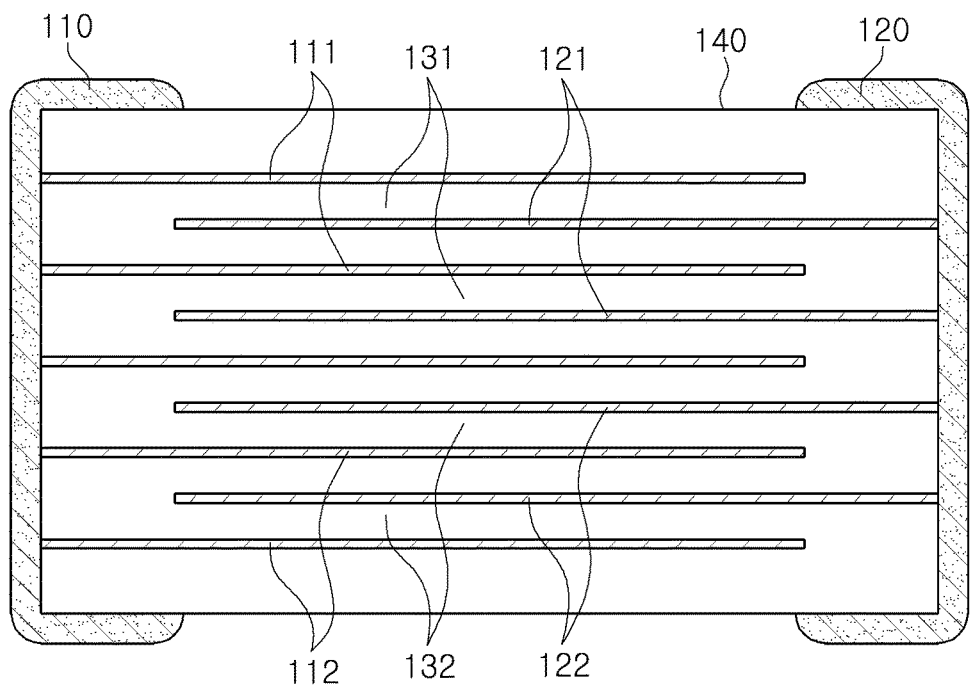
FIG. 2 is a view illustrating an example of a configuration of an electronic component.

FIG. 2 is a view illustrating an example of a configuration of an electronic component. The electronic component includes a first external electrode 110, a second external electrode 120, first internal electrodes 111, second internal electrodes 121, third internal electrodes 112, fourth internal electrodes 122, first dielectric layers 131, second dielectric layers 132, and a ceramic body 140.

As illustrated in FIG. 2, the first external electrode 110 and the second external electrode 120 are formed on both end portions of the ceramic body 140 opposing each other in a first direction (in a length direction in FIG. 2). The first internal electrodes 111, the second internal electrodes 121, the third internal electrodes 112, and the fourth internal electrodes 122 extend in the first direction. One end of each of the first internal electrodes 111 and the third internal electrodes 112 are electrically connected to the first external electrode 110, while one end of each of the second internal electrodes 121 and the fourth internal electrodes 122 are electrically connected to the second external electrode 120.

The first internal electrodes 111 and the second internal electrodes 121 are alternately stacked in a second direction (a thickness direction in FIG. 2) intersecting the first direction, and the first dielectric layers 131 fill spaces between the first internal electrodes 111 and the second internal electrodes 121. Also, the third internal electrodes 112 and the fourth internal electrodes 122 are alternately stacked in the second direction, and the second dielectric layers 132 fill spaces between the third internal electrodes 112 and the fourth internal electrodes 122. The first internal electrodes 111 and the second internal electrodes 121 are disposed in one portion of the ceramic body 140 in the second direction, and the third internal electrodes 112 and the fourth internal electrodes 122 are disposed in the other portion of the ceramic body 140 in the second direction.

The permittivity of the first dielectric layers 131 decreases as temperature increases, and the permittivity of the second dielectric layers 132 increases as temperature increases.

That is, in the electronic component 100 illustrated in FIG. 2, the first internal electrodes 111, the second internal electrodes 121, and the first dielectric layers 131 form the first capacitor C1 illustrated in FIG. 1, and the third internal electrodes 112, the fourth internal electrodes 122, and the second dielectric layers 132 form the second capacitor C2 illustrated in FIG. 1.

As illustrated in FIG. 2, in the electronic component 100 illustrated in FIG. 2, the first internal electrodes 111, the second internal electrodes 121, the third internal electrodes 112, and the fourth internal electrodes 122 are provided in plural. Thus, a capacitor having a high capacitance may be manufactured to be compact, and mass production may be facilitated in terms of a manufacturing process.

As described above, the electronic component 100 illustrated in FIG. 1 may be formed as a multilayer ceramic capacitor as illustrated in FIG. 2. However, the electronic component illustrated in FIG. 1 is not limited to the multilayer ceramic capacitor, and may have various other forms.

Figure 3:
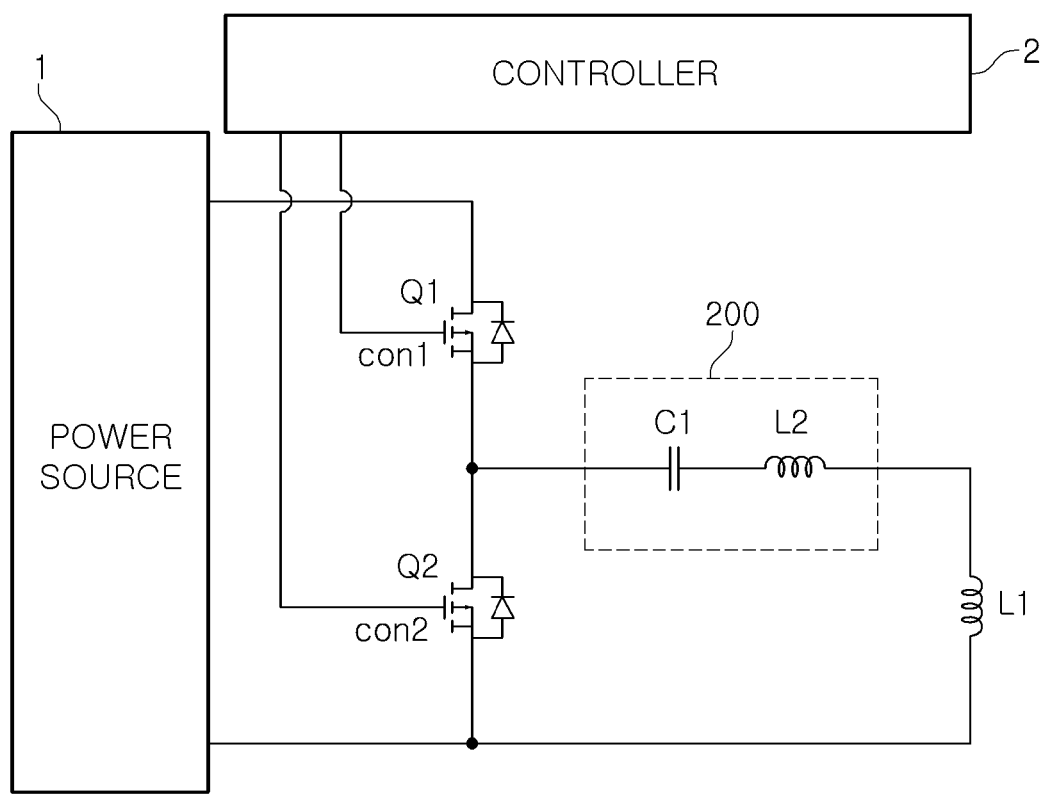
FIG. 3 is a view illustrating an example of a configuration of a wireless power transmitter including an electronic component.

FIG. 3 is a view illustrating an example of a configuration of a wireless power transmitter including an electronic component. The wireless power transmitter includes a power source 1, two switching elements Q1 and Q2, an electronic component 200 including a capacitor C1 and an inductor L2 connected in series with the capacitor C1, a power transmission coil L1, and a controller 2. In the wireless power transmitter illustrated in FIG. 3, the electronic component 200 and the power transmission coil L1 form an LC circuit.

Functions of the blocks illustrated in FIG. 3 will now be described.

Functions and operations of the power source 1, the two switching elements Q1 and Q2, the power transmission coil L1, and the controller 2 are the same as those of the wireless power transmitter of FIG. 1.

The electronic component 200 includes the capacitor C1 and the inductor L2 connected in series with each other. The capacitance of the capacitor C1 is inversely proportional to temperature, while the inductance of the inductor L2 is directly proportional to temperature. Alternatively, the capacitance of the capacitor C1 may be directly proportional to temperature, while the inductance of the inductor L2 may be inversely proportional to temperature. A variation in the inductance of the inductor L2 according to temperature may be determined by a structure, a material, or a size of the inductor L2. That is, by appropriately selecting any one or any combination of any two or more of a structure, a material, and a size of the inductor L2, a variation in the capacitance of the capacitor C1 according to temperature may be compensated for by a variation in the inductance of the inductor L2 according to temperature.

The electronic component 200 may include a capacitor and an inductor disposed separately from each other, and a capacitor and an inductor may be configured as a single component. The capacitor C1 may be configured as a plurality of capacitors, while the inductor L2 may be configured as a plurality of inductors.

That is, a resonant frequency of the wireless power transmitter illustrated in FIG. 3 is determined by the capacitance of the capacitor C1 of the electronic component 200, the inductance of the inductor L2 of the electronic component 200, and the inductance of the power transmission coil L1. As described above, by appropriately selecting any one or any combination of any two or more of a structure, a material, and a size of the inductor L2, a variation in the capacitance of the capacitor C1 according to temperature may be compensated for by a variation in the inductance of the inductor L2 according to temperature, and as a result, a resonant frequency of the wireless power transmitter remains constant regardless of temperature.

Figure 4:
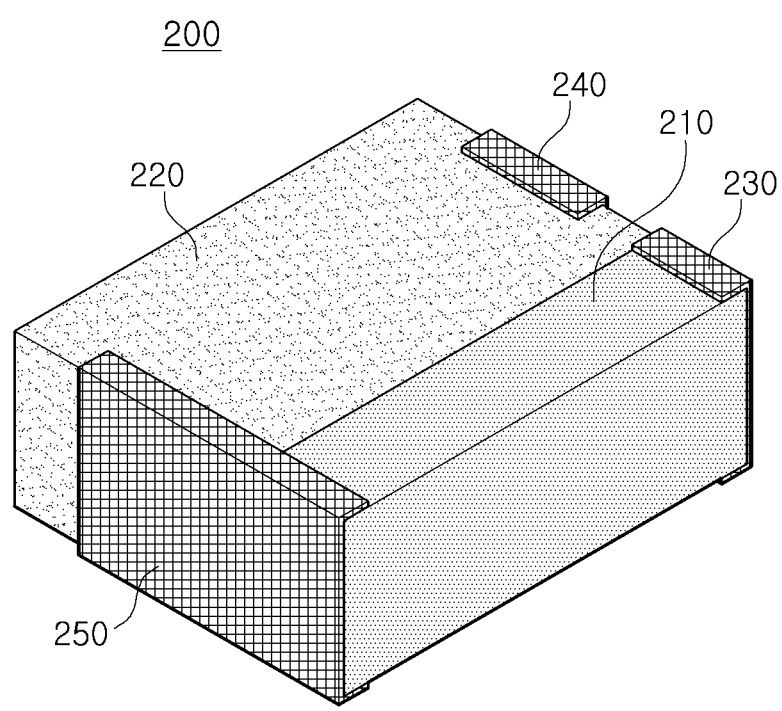
FIG. 4 is a view illustrating another example of a configuration of an electronic component.

FIG. 4 is a view illustrating another example of a configuration of an electronic component. The electronic component 200 includes a capacitor unit 210, an inductor unit 220, a first external electrode 230, a second external electrode 240, and a third external electrode 250.

The capacitor unit 210 includes dielectric layers, first internal electrodes, and second internal electrodes, and the first internal electrodes and the second internal electrodes are disposed facing each other with the dielectric layers interposed therebetween. The first internal electrodes are electrically connected to the first external electrode 230, and the second internal electrodes are electrically connected to the third external electrode 250.

The inductor unit 220 includes a multilayer inductor manufactured by printing relatively thick electrodes on relatively thin ferrite or glass ceramic sheets, stacking several sheets with coil patterns printed thereon, and connecting internal conducting wires through via holes; a thin-film inductor manufactured by forming coil wires on a ceramic substrate by thin film sputtering or plating and filling spaces with a ferrite material; a wound inductor manufactured by winding a line material (a coil wire) around a core, or a laser-cut helix inductor manufactured by forming an electrode layer on a ceramic bobbin by sputtering or plating and subsequently forming a helix coil shape by cutting the electrode layer with a laser. In each case, one end of the inductor is electrically connected to the third external electrode 250, and the other end of the inductor is electrically connected to the second external electrode 240.

As described above, a variation in the inductance of an inductor according to temperature vary depending on a structure, a material, and a size of the inductor. Thus, by appropriately selecting any one or any combination of any two or more of the structure, the material, and the size of the inductor in the inductor unit 220 so that the inductance of the inductor of the inductor unit 220 compensates for a variation in the capacitance of the capacitor in the capacitor unit 210 of the electronic component 200 according to temperature, a resonant frequency of the LC circuit including the electronic component 200 will remain constant regardless of temperature.

Figure 5:
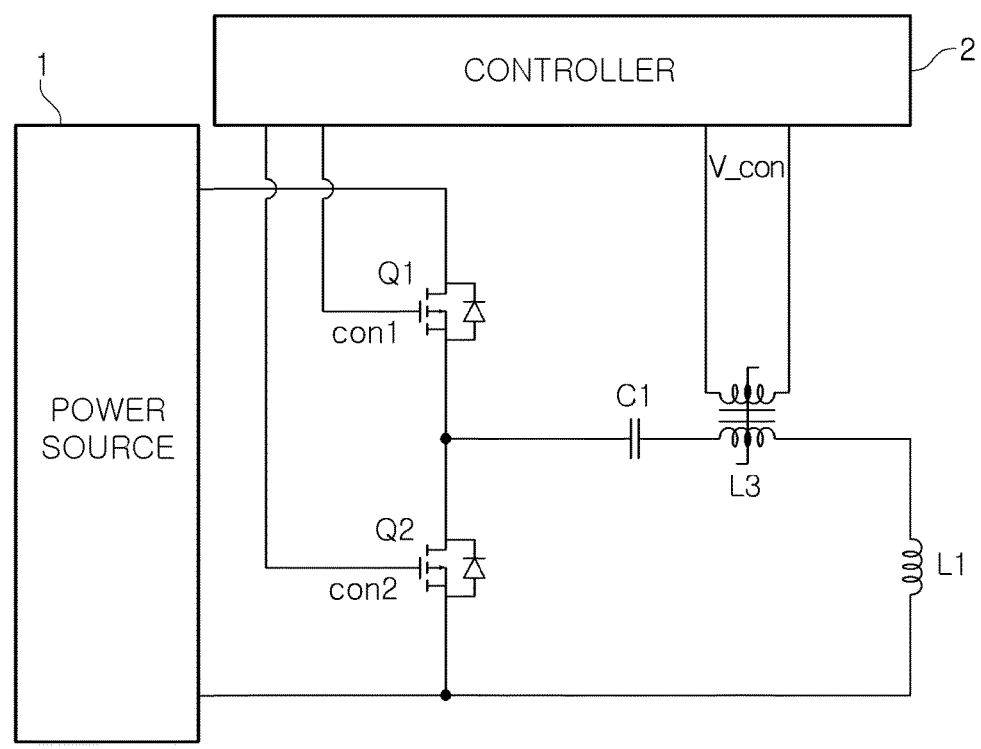
FIGS. 5 through 8 are views illustrating other examples of a configuration of an apparatus including an electronic component.

FIG. 5 is a view illustrating another example of a configuration of an apparatus including an electronic component. As represented in FIG. 5, the apparatus is a wireless power transmitter. The wireless power transmitter includes a power source 1, two switching elements Q1 and Q2, a capacitor C1, a variable inductor L3 connected in series with the capacitor C1, a power transmission coil L1, and a controller 2. In the wireless power transmitter illustrated in FIG. 5, the capacitor C1, the variable inductor L3, and the power transmission coil L1 form an LC circuit.

Functions of the blocks illustrated in FIG. 5 will now be described.

Functions and operations of the power source 1, the two switching elements Q1 and Q2, and the power transmission coil L1 are the same as those of the wireless power transmitter of FIG. 1.

Functions and operations of the controller 2 are the same as those of the controller 2 of FIG. 1, except that a control voltage V_con is additionally output. That is, the controller 2 additionally outputs the control voltage V_con for adjusting the inductance of the variable inductor L3. In detail, when a temperature changes, the capacitance of the capacitor C1 changes. By appropriately determining the control voltage V_con to change the inductance of the variable inductor L3 to compensate for the variation in the capacitance of the capacitor C1 according to temperature, a resonant frequency of the LC circuit formed by the capacitor C1, the variable inductor L3, and the power transmission coil L1 remains constant despite changes in temperature. A magnitude of the control voltage V_con may be determined according to temperature or a magnitude of a voltage of the power transmission coil L1.

Thus, if the capacitance of the capacitor C1 increases with a change in temperature, the controller 2 outputs the control signal V_con to decrease the inductance of the variable inductor L3 to compensate for the increase in the capacitance of the capacitor C1 so that the resonant frequency of the LC circuit remains constant. Also, if the capacitance of the capacitor C1 decreases with a change in temperature, the controller 2 outputs the control signal V_con to increase the inductance of the variable inductor L3 to compensate for the decrease in the capacitance of the capacitor C1 so that the resonant frequency of the LC circuit remains constant.

Figure 6:
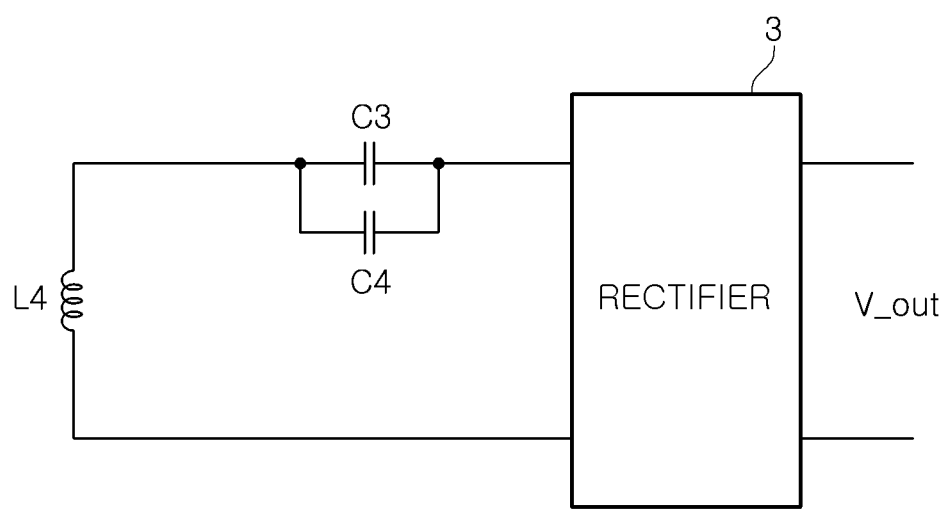

FIG. 6 is a view illustrating another example of a configuration of an apparatus including an electronic component. As represented in FIG. 6, the apparatus is a wireless power receiver. The wireless power receiver including an electronic component includes a power reception coil L4, two capacitors C3 and C4, and a rectifier 3. In FIG. 6, the power reception coil L4 and two capacitors C3 and C4 form an LC circuit.

Functions of the blocks illustrated in FIG. 6 will now be described.

The power reception coil L4 receives power wirelessly.

The capacitor C3 includes a dielectric material having a permittivity that decreases as temperature increases, and the capacitor C4 includes a dielectric material having a permittivity that increases as temperature increases. That is, the capacitance of the capacitor C3 is inversely proportional to temperature, and the capacitance of the capacitor C4 is directly proportional to temperature. The magnitude in the variation in the capacitance of the capacitor C3 according to a unit change in temperature and the magnitude of the variation in the capacitance of the capacitor C4 according to a unit change in temperature are substantially equal at the same temperature. Thus, even when temperature changes occur, a resonant frequency of the LC circuit formed by the power reception coil L4 and the two capacitors C3 and C4 remains constant.

Similar to the wireless power transmitter of FIG. 1, the wireless power receiver includes the two separate capacitors C3 and C4, and the two capacitors C3 and C4 constitute a single component, for example, a multilayer ceramic capacitor. Also, each of the capacitors C3 and C4 may be configured as a plurality of capacitors. When the two capacitors C3 and C4 are configured as a single component, a configuration thereof may be the same as that of the electronic component illustrated in FIG. 2.

The rectifier 3 rectifies the power received wirelessly and outputs an output voltage V_out.

Figure 7:
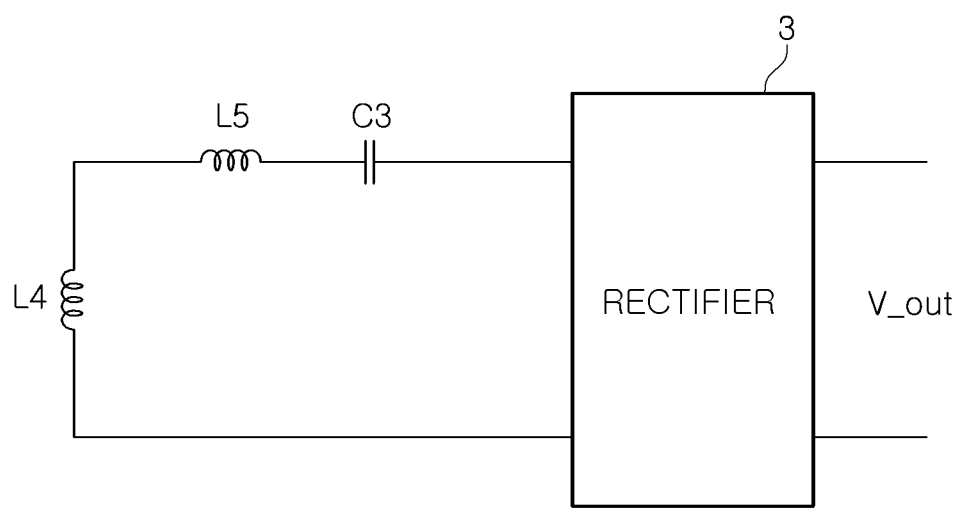

FIG. 7 is a view illustrating another example of a configuration of an apparatus including an electronic component. As represented in FIG. 7, the apparatus is a wireless power receiver. The wireless power receiver including an electronic component includes a power reception coil L4, a capacitor C3, an inductor L5, and a rectifier 3. In FIG. 7, the power reception coil L4, the capacitor C3, and the inductor L5 form an LC circuit.

Functions and operations of the power reception coil L4 and the rectifier 3 are the same as those of FIG. 6.

Similar to the wireless power transmitter of FIG. 3, the capacitance of the capacitor C3 is inversely proportional to temperature and the inductance of the inductor L5 is directly proportional to temperature. Alternatively, the capacitance of the capacitor C3 may be directly proportional to temperature, while the inductance of the inductor L5 may be inversely proportional to temperature. By appropriately selecting any one or any combination of a structure, a material, and a size of the inductor L5, a variation in the capacitance of the capacitor C3 according to temperature may be compensated for by a variation in the inductance of the inductor L5 according to temperature.

The wireless power receiver may include the capacitor C3 and the inductor L5 disposed separately from each other, or may include a single component configured by integrating the capacitor C3 and the inductor L5. Also, the capacitor C3 may be configured as a plurality of capacitors, and the inductor L5 may be configured as a plurality of inductors.

In a case in which the capacitor C3 and the inductor L5 are integrated to form a single component, a configuration thereof may be the same as the electronic component illustrated in FIG. 4.

Figure 8:
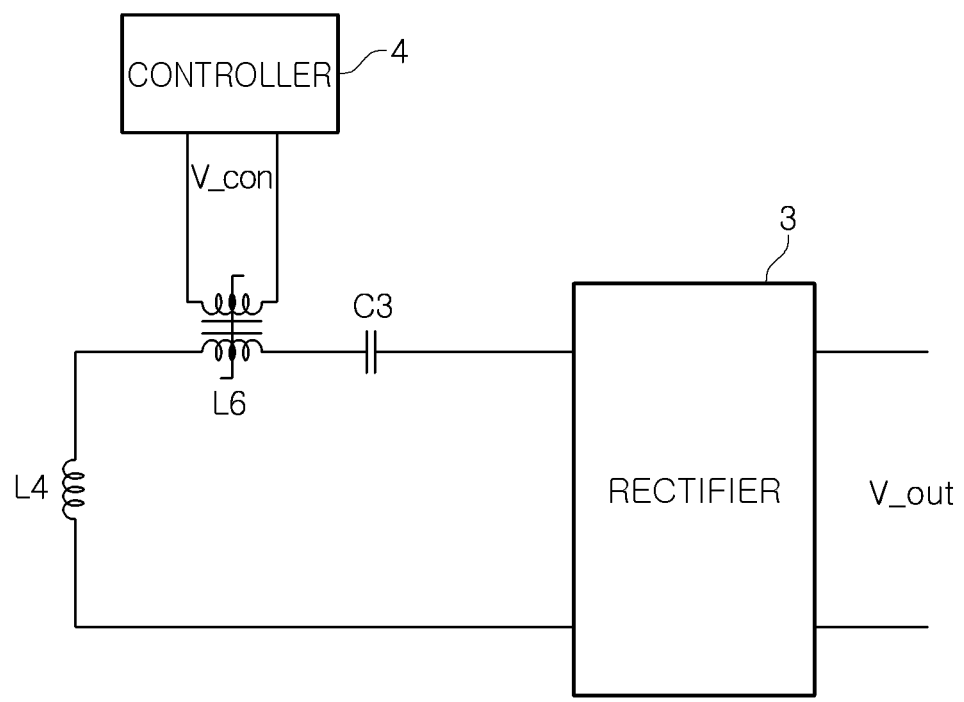

FIG. 8 is a view illustrating another example of a configuration of an apparatus including an electronic component. As represented in FIG. 8, the apparatus is a wireless power receiver. The wireless power receiver includes a power reception coil L4, a capacitor C3, a variable inductor L6, a rectifier 3, and a controller 4. In FIG. 8, the power reception coil L4, the capacitor C3, and the variable inductor L6 form an LC circuit.

Functions and operations of the power reception coil L4 and the rectifier 3 are the same as those of FIG. 6.

The controller 4 outputs a control voltage V_con for adjusting the inductance of the variable inductor L6. Similar to the wireless power transmitter of FIG. 5, by appropriately determining the control voltage V_con to compensate for the variation in the capacitance of the capacitor C3 according to changes in temperature, a resonant frequency of the LC circuit formed by the capacitor C3, the variable inductor L6, and the power reception coil L4 remains constant in spite of the changes in temperature. A magnitude of the control voltage V_con may be determined according to temperature or a magnitude of a voltage across the power reception coil L4.

Thus, if the capacitance of the capacitor C1 increases with a change in temperature, the controller 2 outputs the control signal V_con to decrease the inductance of the variable inductor L3 to compensate for the increase in the capacitance of the capacitor C1 so that the resonant frequency of the LC circuit remains constant. Also, if the capacitance of the capacitor C1 decreases with a change in temperature, the controller 2 outputs the control signal V_con to increase the inductance of the variable inductor L3 to compensate for the decrease in the capacitance of the capacitor C1 so that the resonant frequency of the LC circuit remains constant.

Figure 9:
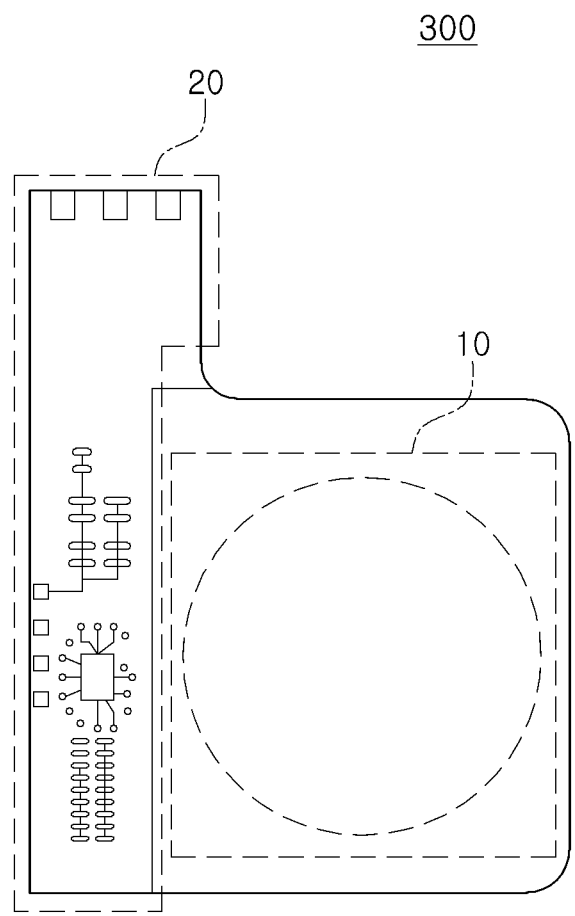
FIG. 9 is a view illustrating an example of a wireless power receiver including an electronic component.

FIG. 9 is a view illustrating an example of a wireless power receiver including an electronic component. The wireless power receiver including an electronic component includes a printed circuit board (PCB) including a first area 10 in which a power reception coil is mounted, and a second area 20 in which a circuit including an electronic component is mounted.

For example, the power reception coil L4 of FIGS. 6 through 8 is mounted in the first area 10, and the capacitors C3 and C4 and the rectifier 3 of FIG. 6, or the capacitor C3, the inductor L5, and the rectifier 3 of FIG. 7, or the capacitor C3, the variable inductor L6, the rectifier 3, and the controller 4 of FIG. 8, are mounted in the second area 20. In one example, a single component formed by integrating the capacitors C3 and C4 of FIG. 6 may be mounted in the second area 20, or a single component formed by integrating the capacitor C3 and the inductor L5 of FIG. 7 may be mounted in the second area 20. In another example, the capacitors C3 and C4 may be disposed in the first area 10. The capacitors C3 and C4 may be embedded within the PCB.

Figure 10:
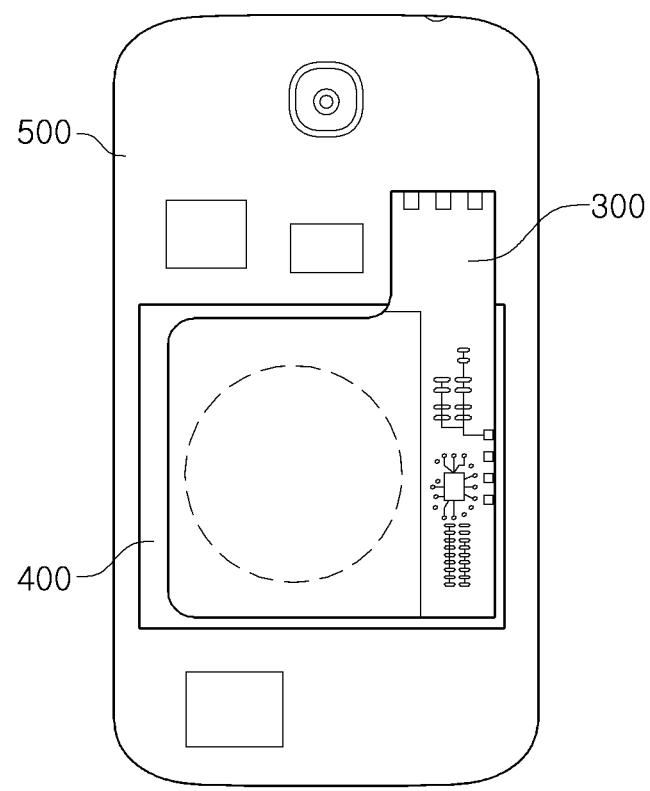
FIG. 10 is a view illustrating an example in which a wireless power receiver including an electronic component is installed in an electronic device.

FIG. 10 is a view illustrating an example in which a wireless power receiver including an electronic component is installed in an electronic device.

As illustrated in FIG. 10, a wireless power receiver 300 is installed in a rear portion of an electronic device 500. The electronic device 500 includes a terminal connected to a rechargeable battery 400. The wireless power receiver 300 is disposed at a position in which a terminal of the wireless power receiver 300 and a terminal of the electronic device 500 are connected to each other so that power received wirelessly by the wireless power receiver 300 is supplied to the rechargeable battery 400.

In the example in FIG. 10, the wireless power receiver 300 is installed in the rear portion of the electronic device 500, but the wireless power receiver 300 may be installed in the electronic device 500 in various manners. For example, the electronic device 500 may include a port (for example, a USB port, or other port known to one of ordinary skill in the art capable of receiving power), and the wireless power receiver 300 may be connected to the port.

In addition, the wireless power receiver 300 may be integrated with the rechargeable battery 400, or may be integrated with the electronic device 500.

In the examples described above, the electronic component, the wireless power transmitter including the electronic component, and the wireless power receiver including the electronic component have a resonant frequency that remains constant regardless of changes in temperature. Thus, a capacity of the wireless power transmitter and the wireless power receiver may be increased without causing a problem such as a reduction in a wireless power transmission efficiency, an increase in loss of an LC circuit, and heat dissipation.

The controller 2 illustrated in FIGS. 1, 3, and 5 and the controller 4 in FIG. 8 that perform the operations described herein with respect to FIGS. 1, 3, 5, and 8 are implemented by hardware components. Examples of hardware components include controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1, 3, 5, and 8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components as described above are written as computer programs, code segments, instructions or any combination thereof, for individually or collectively instructing or configuring the processor or computer to operate as a machine or special-purpose computer to perform the operations performed by the hardware components as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components as described above.

The instructions or software to control a processor or computer to implement the hardware components as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic component comprising:
   a first capacitor comprising a first dielectric material having a permittivity that is inversely proportional to temperature; and
   a second capacitor connected in parallel with the first capacitor and comprising a second dielectric material having a permittivity that is directly proportional to temperature,
   wherein the first capacitor and the second capacitor comprise:
   a ceramic body;
   a first external electrode and a second external electrode respectively disposed on opposing end portions of the ceramic body in a first direction; and
   first, second, third and fourth internal electrodes disposed in the ceramic body and extending in the first direction and stacked in a second direction intersecting the first direction;
   wherein the first and third internal electrodes are connected to the first external electrode;
   the second and fourth internal electrodes are connected to the second external electrode;
   the first dielectric material is disposed in the ceramic body between the first and second internal electrodes;
   the second dielectric material is disposed in the ceramic body between the third and fourth internal electrodes;
   the first and second internal electrodes and the first dielectric material constitute the first capacitor; and
   the third and fourth internal electrodes and the second dielectric material constitute the second capacitor.

2. The electronic component of claim 1, wherein a variation in a capacitance of the first capacitor according to a unit change in temperature and a variation in a capacitance of the second capacitor according to a unit change in temperature are substantially equal in magnitude but opposite in sign at a same temperature.

3. The electronic component of claim 1, wherein the first and second internal electrodes are disposed in one portion of the ceramic body in the second direction; and
   the third and fourth internal electrodes are disposed in another portion of the ceramic body in the second direction.

4. The electronic component of claim 1, wherein each of the first, second, third, and fourth internal electrodes is provided in plural.

5. An apparatus comprising:
   an electronic component comprising:
      a first capacitor comprising a first dielectric material having a permittivity that is inversely proportional to temperature; and
      a second capacitor connected in parallel with the first capacitor and comprising a second dielectric material having a permittivity that is directly proportional to temperature;
   a coil connected to the electronic component; and
   a power supply configured to supply alternating current (AC) power to the electronic component and the coil to cause the coil to transmit the supplied AC power wirelessly,
   wherein the first capacitor and the second capacitor comprise:
   a ceramic body;
   a first external electrode and a second external electrode respectively disposed on opposing end portions of the ceramic body in a first direction; and
   first, second, third and fourth internal electrodes disposed in the ceramic body and extending in the first direction and stacked in a second direction intersecting the first direction;
   wherein the first and third internal electrodes are connected to the first external electrode;
   the second and fourth internal electrodes are connected to the second external electrode;
   the first dielectric material is disposed in the ceramic body between the first and second internal electrodes;
   the second dielectric material is disposed in the ceramic body between the third and fourth internal electrodes;
   the first and second internal electrodes and the first dielectric material constitute the first capacitor; and
   the third and fourth internal electrodes and the second dielectric material constitute the second capacitor.

6. The apparatus of claim 5, wherein the power supply comprises:
   a controller configured to output a control signal;
   a power source configured to convert input power into supply power and output the supply power; and
   a switching circuit configured to convert the supply power into the AC power in response to the control signal and output the AC power to the electronic component and the coil.

7. The apparatus of claim 6, wherein the switching circuit comprises a switch configured to be turned on and off by the control signal at a switching frequency equal or substantially equal to a resonant frequency determined by the electronic component and the coil.

8. The apparatus of claim 5, wherein a variation in a capacitance of the first capacitor according to a unit change in temperature and a variation in a capacitance of the second capacitor according to a unit change in temperature are substantially equal in magnitude but opposite in sign at a same temperature.

9. The apparatus of claim 5, wherein the coil is configured to receive power wirelessly;
   the apparatus further comprises a rectifier configured to rectify the power received by the coil to output an output voltage.

10. The apparatus of claim 9, wherein the apparatus further comprises a printed circuit board (PCB) comprising a first area in which the coil is disposed, and a second area in which the rectifier and the electronic component are disposed.

11. The apparatus of claim 9, wherein the apparatus further comprises a printed circuit board (PCB) comprising a first area in which the coil is disposed, and a second area in which the rectifier is disposed; and
   the first capacitor and the second capacitor are embedded within the PCB.

12. The apparatus of claim 9, wherein a variation in a capacitance of the first capacitor according to a unit change in temperature and a variation in a capacitance of the second capacitor according to a unit change in temperature are substantially equal in magnitude but opposite in sign at a same temperature.

13. The apparatus of claim 9, wherein the first capacitor and the second capacitor comprise:
   a ceramic body;
   a first external electrode and a second external electrode respectively disposed on opposing end portions of the ceramic body in a first direction; and
   first, second, third and fourth internal electrodes disposed in the ceramic body and extending in the first direction and stacked in a second direction intersecting the first direction;
   wherein the first and third internal electrodes are connected to the first external electrode;
   the second and fourth internal electrodes are connected to the second external electrode;
   the first dielectric material is disposed in the ceramic body between the first and second internal electrodes;
   the second dielectric material is disposed in the ceramic body between the third and fourth internal electrodes;
   the first and second internal electrodes and the first dielectric material constitute the first capacitor; and
   the third and fourth internal electrodes and the second dielectric material constitute the second capacitor.

14. An apparatus comprising:
   an electronic component comprising:
      a first element having a characteristic that changes with temperature; and
      a second element connected to the first element and having a characteristic that changes with temperature in a direction that is opposite to a direction in which the characteristic of the first element changes with temperature; and
      a coil connected to the electronic component and forming a resonant circuit with the electronic component,
   wherein
      the first element is a capacitor having a permittivity that is inversely proportional to temperature, and the second element is an inductor connected in series with the capacitor and having an inductance that is directly proportional to temperature; or
      the first element is a capacitor having a permittivity that is directly proportional to temperature, and the second element is an inductor connected in series with the capacitor and having an inductance that is inversely proportional to temperature, wherein the first element and the second element comprise:
      a ceramic body;
      a first external electrode and a second external electrode separately disposed on a first end of the ceramic body,
      a third external electrode disposed on an opposing end of the ceramic body in a first direction; and
      first and second internal electrodes disposed in the ceramic body and extending in the first direction and stacked in a second direction intersecting the first direction, and wherein
      the first internal electrode is connected to the first external electrode;
      the second internal electrode is connected to the third external electrode;
      a first dielectric material is disposed in the ceramic body between the first and second internal electrodes;
      the first and second internal electrodes and the first dielectric material constitute the first capacitor; and
      one end of the inductor is electrically connected to the third external electrode, and the other end of the inductor is electrically connected to the second external electrode.

* * * * *